United States Patent
Tokito (10) Patent No.: US 10,279,688 B2
(45) Date of Patent: May 7, 2019

(54) CHARGE-DISCHARGE CONTROL DEVICE FOR CONTROLLING TEMPERATURE OF A POWER STORAGE DEVICE

(71) Applicant: Mitsubishi Electric Corporation, Chiyoda-ku, Tokyo (JP)

(72) Inventor: Kosuke Tokito, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 128 days.

(21) Appl. No.: 15/518,384

(22) PCT Filed: Jan. 15, 2015

(86) PCT No.: PCT/JP2015/050958
§ 371 (c)(1),
(2) Date: Apr. 11, 2017

(87) PCT Pub. No.: WO2016/113880
PCT Pub. Date: Jul. 21, 2016

(65) Prior Publication Data
US 2017/0326990 A1 Nov. 16, 2017

(51) Int. Cl.
*H01M 10/46* (2006.01)
*B60L 11/18* (2006.01)
(Continued)

(52) U.S. Cl.
CPC .............. *B60L 11/18* (2013.01); *B60L 11/08* (2013.01); *B60L 11/12* (2013.01);
(Continued)

(58) Field of Classification Search
CPC ................... H02J 7/0021; H02J 7/0026; H02J 2007/0067; H02J 7/0078; H02J 7/0091
(Continued)

(56) References Cited

U.S. PATENT DOCUMENTS 5,362,942 A 11/1994 Vanderslice, Jr. et al.
2015/0295448 A1* 10/2015 Sugeno ............. H01M 10/4207
701/22

FOREIGN PATENT DOCUMENTS

JP 2003-032901 A 1/2003
JP 2003-134604 A 5/2003
(Continued)

OTHER PUBLICATIONS

Extended European Search Report dated Jul. 26, 2018, issued by the European Patent Office in corresponding European Application No. 15877832.4. (7 pages).

(Continued)

*Primary Examiner* — Edward Tso
(74) *Attorney, Agent, or Firm* — Buchanan Ingersoll & Rooney PC (57) ABSTRACT

A charge-discharge control device charges a power storage device when the charge-discharge control device acquires no warming-up operation command. The charge-discharge control device, when the charge-discharge control device acquires the warming-up operation command, performs warming-up operation by repeated alternatingly charging the power storage device and discharging the power storage device via a first discharger. When a determiner determines during the warming-up operation that an amount of power discharged via the first discharger does not satisfy a criterion, the charge-discharge control device performs the warming-up operation by repeated alternatingly charging the power storage device and discharging the power storage device via a second discharger.

7 Claims, 8 Drawing Sheets

(51) Int. Cl.
*H01M 10/615* (2014.01)
*H01M 10/625* (2014.01)
*H01M 10/633* (2014.01)
*B60L 11/08* (2006.01)
*B60L 11/12* (2006.01)
*H01M 10/44* (2006.01)
*H01M 10/48* (2006.01)
*H01M 10/637* (2014.01)

(52) U.S. Cl.
CPC ....... *B60L 11/1872* (2013.01); *B60L 11/1875* (2013.01); *H01M 10/44* (2013.01); *H01M 10/48* (2013.01); *H01M 10/615* (2015.04); *H01M 10/625* (2015.04); *H01M 10/633* (2015.04); *H01M 10/637* (2015.04); *B60L 2240/545* (2013.01); *H01M 2220/20* (2013.01); *Y02T 10/705* (2013.01); *Y02T 10/7005* (2013.01)

(58) Field of Classification Search
USPC .................. 320/107, 124, 125, 127, 135
See application file for complete search history.

(56) References Cited

FOREIGN PATENT DOCUMENTS

| | | |
|---|---|---|
| JP | 2004-320882 A | 11/2004 |
| JP | 2006-238543 A | 9/2006 |
| JP | 2008-042980 A | 2/2008 |
| JP | 2011-076927 A | 4/2011 |
| JP | 2012-252907 A | 12/2012 |
| JP | 5652378 B2 | 1/2015 |

OTHER PUBLICATIONS

International Search Report (PCT/ISA/210) dated Mar. 17, 2015, by the Japanese Patent Office as the International Searching Authority for International Application No. PCT/JP2015/050958.

Written Opinion (PCT/ISA/237) dated Mar. 17, 2015, by the Japanese Patent Office as the International Searching Authority for International Application No. PCT/JP2015/050958.

* cited by examiner

CHARGE-DISCHARGE CONTROL DEVICE FOR CONTROLLING TEMPERATURE OF A POWER STORAGE DEVICE

TECHNICAL FIELD

The present disclosure relates to a charge-discharge control device.

BACKGROUND ART

Electric railway vehicles ("electric vehicles", hereafter) equipped with a power storage device run on non-electrified routes, where no overhead power lines are installed, by means of a motor driven using power output from the power storage device. As the power storage device, for example, a secondary battery, such as a nickel-hydrogen battery or a lithium ion battery, or an electric double-layer capacitor is used. In low temperature conditions, the internal resistance of the power storage device increases, and therefore the power dischargeable from the power storage device may possibly decrease. Thus techniques have been developed for raising the temperature of the power storage device.

A railway vehicle drive control device disclosed in Patent Literature 1 expedites rise in the temperature of a storage battery, without operating an inverter, by repeatedly charging the storage battery using engine power generation and discharging the storage battery to drive a power generator so as to absorb a load at the engine brake.

CITATION LIST

Patent Literature

Patent Literature 1: Unexamined Japanese Patent Application Kokai Publication No. 2008-042980.

SUMMARY OF INVENTION

Technical Problem

When the load is not sufficiently absorbed at the engine brake for some reason, the railway vehicle drive control device disclosed in the Patent Literature 1 fails to raise the temperature of the storage battery.

The present disclosure is made in view of the above circumstances, and an objective of the present disclosure is to more reliably raise temperature of the power storage device.

Solution to Problem

In order to achieve the above objective, the charge-discharge control device of the present disclosure includes a power storage device, a first discharger, a second discharger, a controller, and a determiner. The power storage device is connected to an output side of a power converter. The first discharger is electrically connected to, and discharges, the power storage device. The second discharger is electrically connected to, and discharges, the power storage device. The controller charges and discharges the power storage device by controlling an output current of the power converter. The determiner determines whether an amount of power discharged via the first discharger satisfies a criterion. When the controller acquires no warming-up operation command, the controller charges the power storage device; when the controller acquires the warming-up operation command, the controller performs a warming-up operation by repeated alternatingly charging the power storage device and discharging the power storage device via the first discharger, and when the controller acquires the warming-up operation command and the determiner determines that the amount of power discharged via the first discharger does not satisfy the criterion during the warming-up operation, the controller performs the warming-up operation by repeated alternatingly charging the power storage device and discharging the power storage device via the second discharger.

Advantageous Effects of Invention

The present disclosure makes it possible to more reliably raise the temperature of a power storage device by, when the amount of power discharged via a first discharger does not satisfy the criterion, discharging the power storage device via a second discharger.

DESCRIPTION OF EMBODIMENTS

Embodiments of the present disclosure are described in detail below with reference to figures. In the figures, components that are the same or equivalent are assigned the same reference signs.

Embodiment 1

Figure 1:
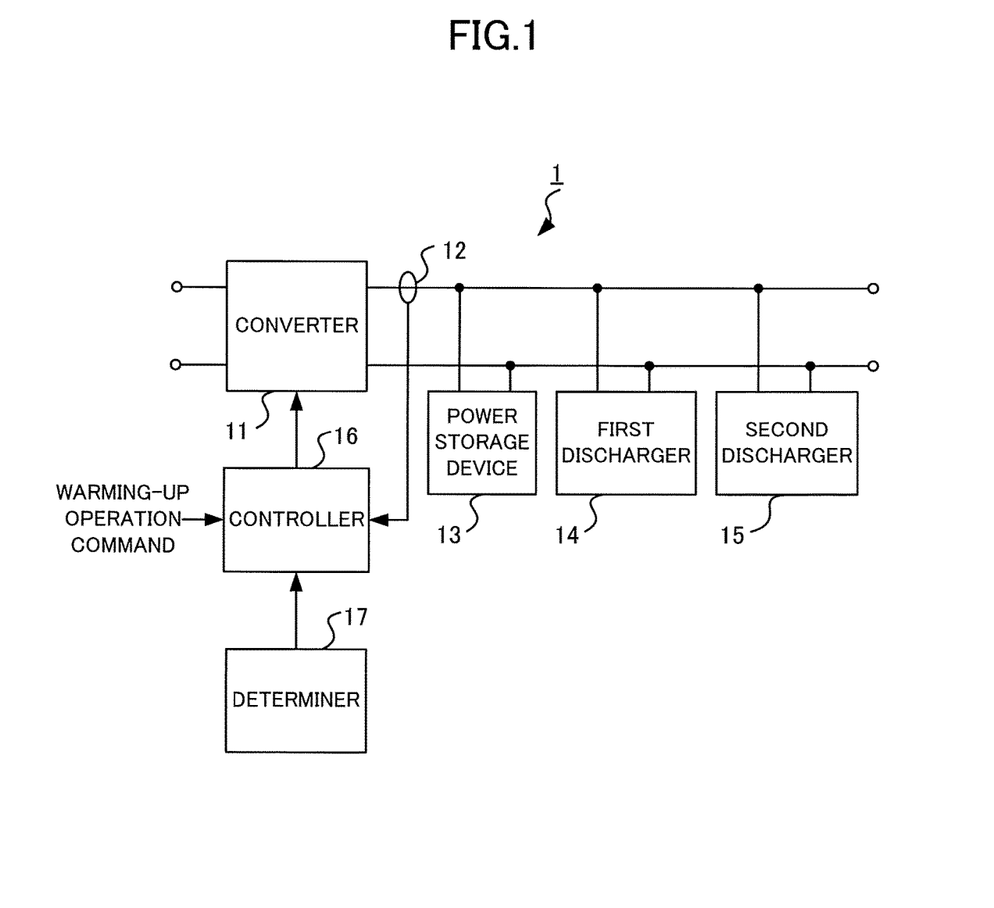
FIG. 1 is a block diagram illustrating an example configuration of a charge-discharge control device according to Embodiment 1 of the present disclosure.

FIG. 1 is a block diagram illustrating an example configuration of the charge-discharge control device according to Embodiment 1 of the present disclosure. A charge-discharge control device 1 converts input power as necessary and supplies the converted power to a not-illustrated load device connected to the output side. Moreover, when the charge-discharge control device 1 acquires no warming-up operation command, the charge-discharge control device 1 charges a power storage device 13. When the charge-discharge control device 1 acquires a warming-up operation command, the charge-discharge control device 1 performs warming-up operation by repeated alternatingly charging the power storage device 13 and discharging the power storage device 13 via a first discharger 14. By performing the warming-up operation by repeated alternately charging and discharging the power storage device 13, the charge-discharge control device 1 raises the temperature of the power storage device 13. When the amount of power discharged via the first discharger 14 does not satisfy a criterion during the warming-up operation, the charge-discharge control device 1 performs warming-up operation by repeated alternately charging the power storage device 13 and discharging the power storage device 13 via a second discharger 1S.

In the example of FIG. 1, the charge-discharge control device 1 includes a converter 11 as a power converter. The charge-discharge control device 1 includes a current sensor 12 detecting the output current of the converter 11, the power storage device 13 charged with power output by the converter 11, and the first discharger 14 and second discharger 15 discharging the power storage device 13. The charge-discharge control device 1 includes a controller 16 controlling the converter 11 and a determiner 17 determining whether the amount of power discharged via the first discharger 14 satisfies a criterion. The controller 16 includes a processor including a central processing unit (CPU), an internal memory, and the like, and a memory including a random access memory (RAM), a flash memory, and the like. The controller 16 executes control programs stored in the memory and controls the converter 11.

A not-illustrated power source is connected to an input side of the converter 11. The power storage device 13, the first discharger 14, the second discharger 15, and the not-illustrated load device are connected in parallel to an output side of the converter 11. The power storage device 13 has a secondary battery, an electric double-layer capacitor, or the like and can store power necessary for driving the load device. The first discharger 14 and the second discharger 15 are electrically connected to the power storage device 13 and discharge the power storage device 13. The first discharger 14 and the second discharger 15 are, for example, an auxiliary power source outputting power of a constant voltage, a discharge device having a switch and a resistance that are connected in series, a power storage system, or the like.

The controller 16 outputs a gate signal for on/off switching of a switching element of the converter 11 on the basis of the output current of the converter 11 detected by the current sensor 12. By controlling the output current of the converter 11, the controller 16 performs the warming-up operation by repeated alternately charging the power storage device 13 and discharging the power storage device 13 via the first discharger 14. The determiner 17 determines whether the amount of power discharged via the first discharger 14 satisfies a criterion during the warming-up operation. When the determiner 17 determines that the amount of power discharged via the first discharger 14 does not satisfy a criterion during the warming-up operation, the controller 16 performs the warming-up operation by repeated alternately charging the power storage device 13 and discharging the power storage device 13 via the second discharger 15.

Figure 2:
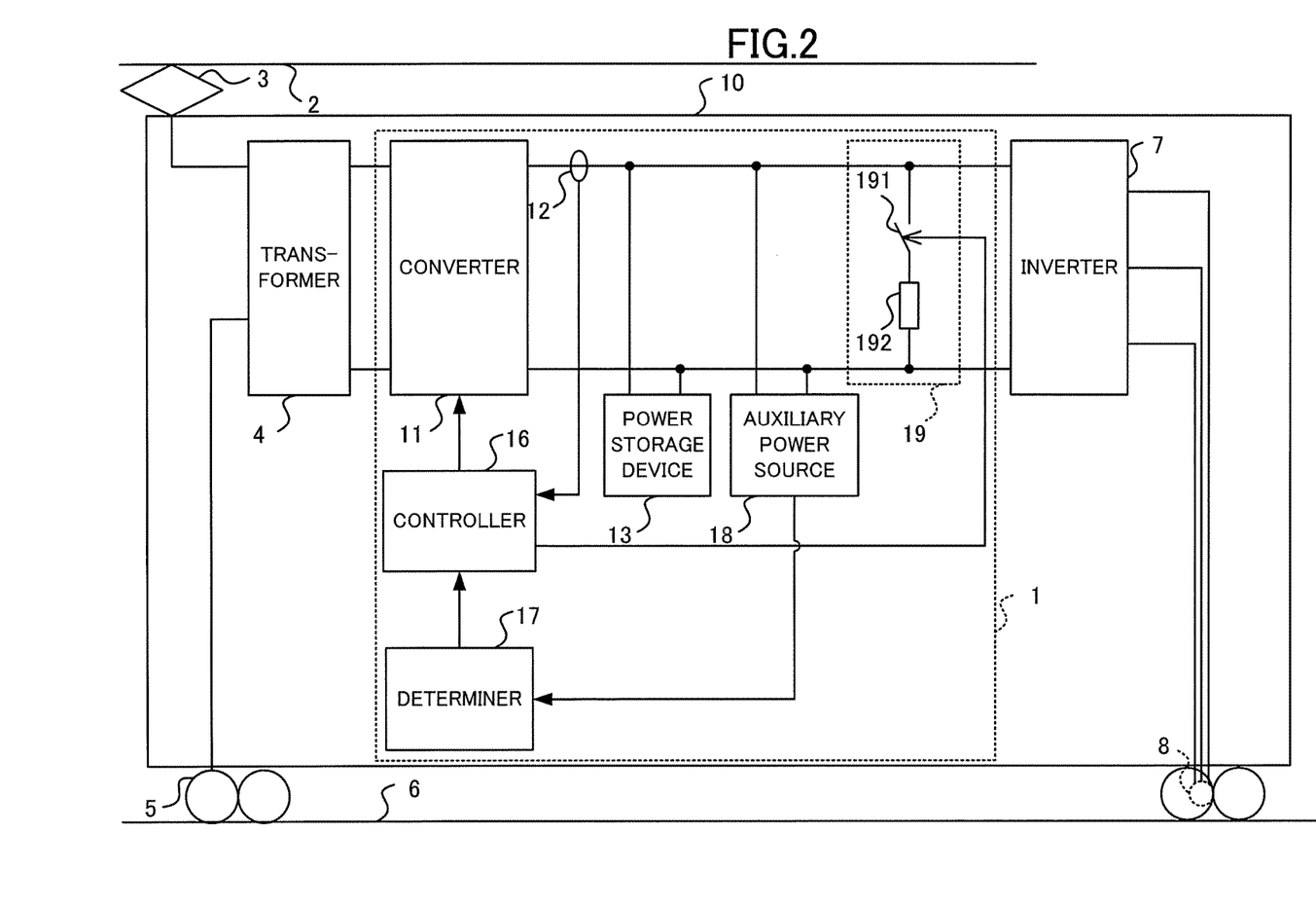
FIG. 2 is a block diagram illustrating an example of mounting the charge-discharge control device according to Embodiment 1 on an electric railway vehicle.

FIG. 2 is a block diagram illustrating an example of mounting the charge-discharge control device according to Embodiment 1 on an electric railway vehicle. The charge-discharge control device 1 is mounted on, for example, an electric railway vehicle ("electric vehicle", hereafter) 10. The charge-discharge control device 1 includes an auxiliary power source 18 as the first discharger 14, and as the second discharger 15, includes a discharge device 19 provided with a switch 191 and a discharge resistance 192 that are connected in series.

Power supplied from a power substation that is the not-illustrated power source is input to a transformer 4 via an overhead power line 2 and a current collector 3 such as a pantograph. The transformer 4 transforms the input voltage to a voltage suitable for input into the converter 11 and supplies power to the converter 11. A return current from the converter 11 returns to the negative electrode side of the power substation via a wheel 5 of the electric vehicle 10 and a rail 6. In the case of the electric vehicle 10 running in direct-current electrified sections, providing of the transformer 4 is not required. The charge-discharge control device 1 can be mounted not only on the electric vehicle 10 as illustrated in FIG. 2 but also on a vehicle supplied with power from a power source via a power supply line. The charge-discharge control device 1 may be mounted, for example, on an electric vehicle supplied with power from a power source via a third rail, on a trolley bus, and the like.

The converter 11 may include any component. The converter 11 illustrated in FIG. 2 performs alternating current (AC)-direct current (DC) conversion. Use is preferred of a pulse width modulation (PWM) converter as the converter 11 performing AC-DC conversion. In direct-current electrified sections, the converter 11 performs DC-DC conversion, and for example, converts a direct-current voltage of approximately 1500 V to a voltage of approximately 700 V.

The power storage device 13, the auxiliary power source 18, the discharge device 19, and an inverter 7 are connected to the output side of the converter 11. When the warming-up operation is not performed, in other words, during normal operation, the power storage device 13 is charged with power acquired via the overhead power line 2 and the current collector 3, and the inverter 7 is driven. The inverter 7 performs DC-AC conversion. Use is preferred of a voltage-type PWM inverter as the inverter 7. An electric motor 8 is connected to the output side of the inverter 7. When the electric motor 8 is driven by the output of the inverter 7, power for driving the electric vehicle 10 is obtained.

Any method of installing the charge-discharge control device 1 on the electric vehicle 10 and any method of entering a warming-up operation command into the charge-discharge control device 1 may be used. For the electric vehicle 10 equipped with the charge-discharge control device 1, for example, before starting the electric vehicle operation the warming-up operation starts by an operating of a warming-up operation switch arranged in a driving cab. When the warming-up operation is performed before starting the electric vehicle operation, the inverter 7 is halted. However, the warming-up operation may also be performed while the inverter 7 is driven. The electric vehicle 10 may include multiple charge-discharge control devices 1.

The controller 16 controls the output current of the converter 11 to perform the warming-up operation by repeated alternately charging the power storage device 13 and discharging the power storage device 13 via the auxiliary power source 18. The auxiliary power source 18 supplies power to a load device, connected to the output side, such as a lighting apparatus, an air-conditioning apparatus, and the like, and outputs a stop signal when the amount of power supplied to the load device is outside a prescribed range. For example, when the load device stops operating or when the auxiliary power source 18 stops operating due to device malfunction within the auxiliary power source 18, the amount of power supplied to the load device decreases and reaches a value outside the prescribed range. Any range can be set on the basis of discharge properties of the power storage device 13.

Upon detection of output of a stop signal from the auxiliary power source 18, the determiner 17 determines that the power discharged via the auxiliary power source 18 does not satisfy the criterion. The determiner 17 outputs to the controller 16 a switch signal that is, for example, at a high level (H) upon determination that the power discharged via the auxiliary power source 18 does not satisfy the criterion, and is at a low level (L) upon determination that the power discharged via the auxiliary power source 18 satisfies the criterion. When the level of the switch signal becomes H during the warming-up operation, the controller 16 performs switching of the switch 191 to perform the warming-up operation by repeated alternately charging power storage device 13 and discharging power storage device 13 via the discharge device 19. When the switch 191 is turned on, the power input to the discharge device 19 is discharged via the discharge resistance 192.

Figure 3:
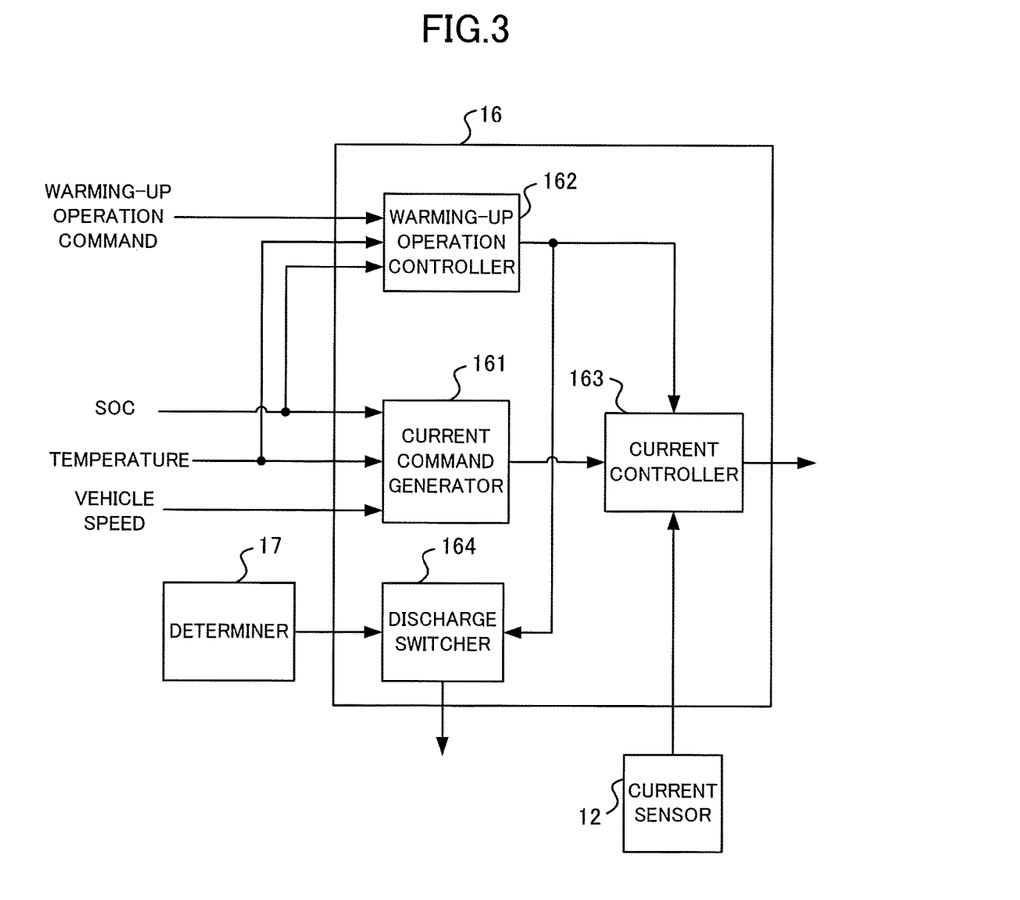
FIG. 3 is a block diagram illustrating an example configuration of a controller according to Embodiment 1.

FIG. 3 is a block diagram illustrating an example configuration of the controller according to Embodiment 1. A current command generator 161 generates a current command value that is a command value of the output current of the converter 11 on the basis of the state of charge (SOC) and temperature of the power storage device 13, and the vehicle speed, and sends the current command value to a current controller 163. The current command value is determined on the basis on the output current to the load device, such as the inverter 7, and the charge current of the power storage device 13. For example, when the vehicle speed is low, the output current to the inverter 7 is small, and therefore the current command value is low. Moreover, for example, when the power storage device 13 is almost fully charged or the temperature of the power storage device 13 is low, the charge current of the power storage device 13 is small, and thus the current command value is low. The controller 16 may receive the current command value from an external source.

The current command generator 161 may generate the current command value on the basis of the voltage of the power storage device 13 instead of the SOC of the power storage device 13, or may generate the current command value based on the SOC, voltage, and temperature of the power storage device 13 and the vehicle speed. The current command generator 161 may acquire the vehicle speed from a speed detector that detects the vehicle speed on the basis of an angular velocity detected by an angular velocity sensor mounted on an axle, or may acquire the vehicle speed from another on-board device such as an automatic train control (ATC) device.

A warming-up operation controller 162 sends a control signal, for switching the power storage device 13 between charging and discharging, to the current controller 163 and a discharge switcher 164. The warming-up operation controller 162 outputs a control signal that is, for example, of a level H for charging the power storage device 13, and is of a level L for discharging the power storage device 13. When the warming-up operation is not in progress, the warming-up operation controller 162 outputs a control signal of the level H so that the power storage device 13 is charged. Upon acquisition of a warming-up operation command from, for example, the driving cab, the warming-up operation controller 162 starts the warming-up operation and outputs a control signal of the level H. The warming-up operation controller 162 may start the warming-up operation and output a control signal of the level H when the warming-up operation controller 162 acquires a warming-up operation command and the temperature of the power storage device 13 is equal to or less than a first threshold. Any value may be selected as the first threshold on the basis of properties of the power storage device 13 and the like. The warming-up operation controller 162 may output a control signal of the level L, for example, when the SOC of the power storage device 13 exceeds the upper limit of the prescribed range at the start of warming-up operation.

During the warming-up operation, the warming-up operation controller 162, on the basis of the SOC of the power storage device 13, switches the power storage device 13 between charging and discharging. During the warming-up operation, the warming-up operation controller 162 outputs a control signal of the level H to charge the power storage device 13 until the SOC of the power storage device 13 reaches the upper limit of the prescribed range. Subsequently, upon the SOC of the power storage device 13 reaching the upper limit, the warming-up operation controller 162 outputs a control signal of the level L to discharge the power storage device 13. Subsequently, upon the SOC of the power storage device 13 reaching the lower limit of the prescribed range, the warming-up operation controller 162 outputs a control signal of the level H to charge the power storage device 13. Due to the above-described control, the warming-up operation controller 162 switches the power storage device 13 between charging and discharging. Any upper limit and any lower limit of the prescribed range may be set according to properties of the power storage device 13 and the like.

Similarly, the warming-up operation controller 162 may switch the power storage device 13 between charging and discharging on the basis of the voltage of the power storage device 13 instead of the SOC of the power storage device 13. Moreover, the warming-up operation controller 162 may switch the power storage device 13 between charging and discharging on the basis of the SOC and voltage of the power storage device 13. The warming-up operation controller 162 outputs a control signal of the level H until the SOC or voltage of the power storage device 13 reaches the upper limit of a prescribed range. Subsequently, upon the SOC or voltage of the power storage device 13 reaching the upper limit, the warming-up operation controller 162 outputs a control signal of the level L. Subsequently, upon the SOC or voltage of the power storage device 13 reaching the lower limit of the prescribed range, the warming-up operation controller 162 outputs a control signal of the level H. Switching the power storage device 13 between charging and discharging on the basis of the SOC and voltage of the power storage device 13 makes possible prevention of overcharge of the power storage device 13 even if either one of the SOC and the voltage is erroneous in value.

When, for example, the temperature of the power storage device 13 reaches a second threshold, the warming-up operation controller 162 ends the warming-up operation and outputs a control signal of the level H to charge the power storage device 13. The second threshold may be set greater in value than the first threshold, and the thresholds may be used by the warming-up operation controller 162 to control the start and end of the warming-up operation so that the thresholds have hysteresis characteristics. For example, the first threshold may be set to 5 degrees, and the second threshold may be set to 10 degrees. In such a case, the warming-up operation controller 162 starts the warming-up operation when the warming-up operation controller 162 acquires a warming-up operation command and the temperature of the power storage device 13 is equal to or less than five degrees, and ends the warming-up operation when the temperature of the power storage device 13 reaches 10 degrees after starting the warming-up operation. The warming-up operation may end at any moment, and the warming-up operation may end after performing the warming-up operation for a fixed length of time.

The current controller 163 outputs a gate signal for controlling the on/off switching of a switching element of the converter 11 on the basis of the current command value, the control signal, and the output current of the converter 11 detected by the current sensor 12. The current controller 163 performs feedback control so that the output current of the converter 11 approaches the current command value during the charging of the power storage device 13, in other words when the control signal is of the level H. The current controller 163 stops the operation of the switching element of the converter 11 during the discharging of the power storage device 13, in other words when the control signal is of the level L. In order to prevent the operation of the charge-discharge control device 1 from becoming unstable due to instantaneous switching of the direction of the output current of the converter 11, the current controller 163 may output a gate signal that maintains the rate of change of the output current of the converter 11 in a prescribed range.

The discharge switcher 164 switches from discharge of the power storage device 13 via the auxiliary power source 18 to discharge of the power storage device 13 via the discharge device 19 when the determiner 17 determines that the amount of power discharged via the auxiliary power source 18 does not satisfy a criterion. The discharge switcher 164 operates the switch 191 on the basis of the switch signal output by the determiner 17 and the control signal output by the warming-up operation controller 162. The discharge switcher 164 opens the switch 191 when the switch signal is of the level H indicating that the amount of power discharged via the auxiliary power source 18 does not satisfy a criterion and the control signal is of the level H. The discharge switcher 164 turns on the switch 191 when the switch signal is of the level H and the control signal is of the level L. Upon turning on of the switch 191, the power storage device 13 is discharged via the discharge resistance 192 instead of the auxiliary power source 18. The switch 191 is open during the time interval when the switch signal is of the level L.

Figure 4:
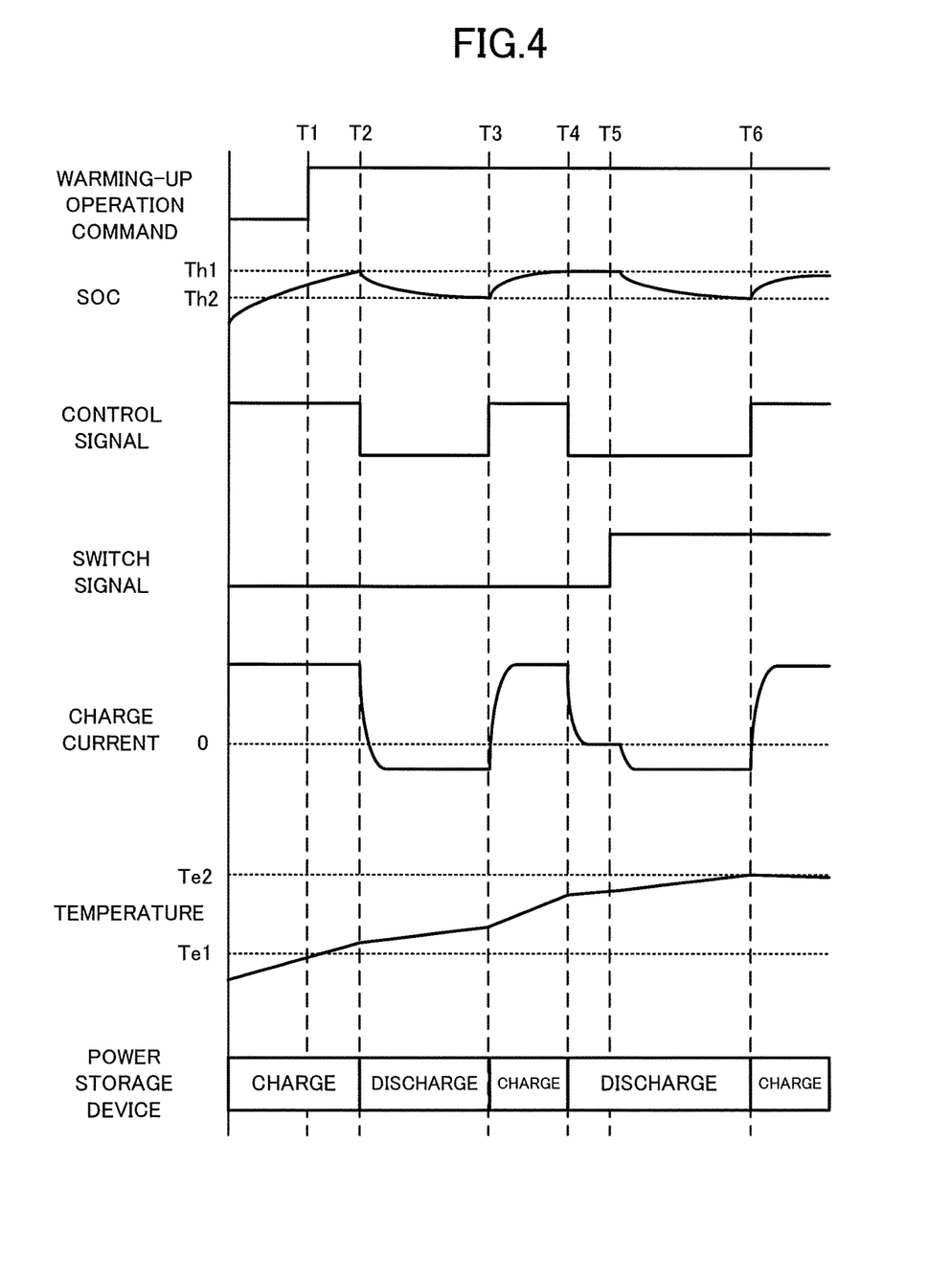
FIG. 4 is a timing chart illustrating an example charge-discharge control operation performed by the charge-discharge control device according to Embodiment 1.

FIG. 4 is a timing chart illustrating an example of charge-discharge control operation performed by the charge-discharge control device according to Embodiment 1. FIG. 4 illustrates changes in each of the warming-up operation command entered from, for example, the driving cab, the SOC of the power storage device 13, the control signal, the switch signal, the charge current flowing from the positive electrode on the output side of the converter 11 to the power storage device 13, the temperature of the power storage device 13, and the charge-discharge state of the power storage device 13. The warming-up operation is described in the case in which a warming-up operation command is acquired at a time T1. In the example of FIG. 4, the load device, connected to the charge-discharge control device 1, for example, the inverter 7, and the like, is halted.

The warming-up operation controller 162 acquires a warming-up operation command at the time T1. Since the temperature of the power storage device 13 is less in value than a first threshold Te1 at the time T1, the warming-up operation controller 162 starts the warming-up operation. Since the SOC of the power storage device 13 is less than an upper limit Th1 of a prescribed range at the time T1, the warming-up operation controller 162 outputs a control signal of the level H. The current controller 163 performs feedback control so that the output current of the converter 1 approaches the current command value and the power storage device 13 is charged.

Since the SOC of the power storage device 13 reaches the upper limit Th1 at a time T2, the warming-up operation controller 162 outputs a control signal of the level L. Since the control signal is of the level L, the current controller 163 outputs a gate signal to stop the operation of the switching element of the converter 11. Upon stoppage of the operation of the switching element of the converter 11, discharging of the power storage device 13 is performed via the auxiliary power source 18.

Due to the SOC of the power storage device 13 reaching a lower limit Th2 of the prescribed range at a time T3, the warming-up operation controller 162 outputs a control signal of the level H. The current controller 163 performs the same control as that from the time T1 to the time T2, and there is charging of the power storage device 13.

Due to the SOC of the power storage device 13 reaching the upper limit Th1 at a time T4, the warming-up operation controller 162 outputs a control signal of the level L. The auxiliary power source 18 is assumed to thereafter output a stop signal. Upon detection of output of the stop signal by the auxiliary power source 18, the determiner 17 outputs a switch signal of the level H at a time T5. Due to the switch signal being of the level H and the control signal is of the level L, the discharge switcher 164 turns on the switch 191, thus causing the start of discharge of the power storage device 13 via the discharge device 19.

Due to the SOC of the power storage device 13 reaching the lower limit Th2 at a time T6, the warming-up operation controller 162 outputs a control signal of the level H. Moreover, the temperature of the power storage device 13 reaches a second threshold Te2 at the time T6. Upon the temperature of the power storage device 13 reaching the second threshold Te2, the warming-up operation controller 162 ends the warming-up operation and outputs a control signal of the level H. The charge-discharge control device 1 ends the warming-up operation when the temperature of the power storage device 13 reaches the second threshold Te2 even if there is input of a warming-up operation command.

Upon the starting of warming-up operation, the power storage device 13 is repeatedly charged and discharged as described above. Even if the auxiliary power source 18 that is the first discharger 14 stops, by use of the discharge device 19 that is the second discharger 15, charging and discharging of the power storage device 13 can continue. Due to repeated alternatingly charging and discharging of the power storage device 13, heat is produced due to internal resistance loss of the power storage device 13, and the temperature of the power storage device 13 rises.

Figure 5:
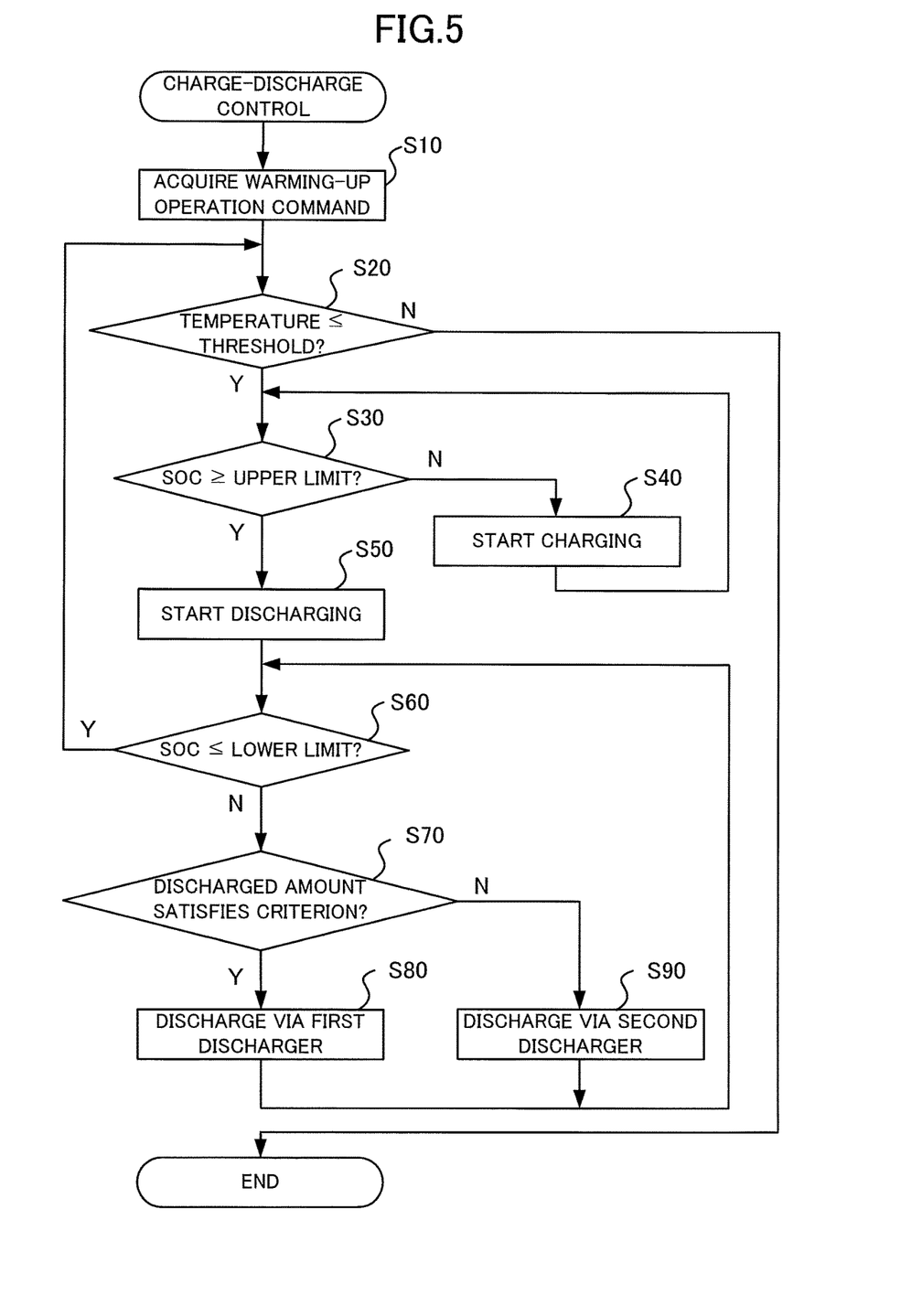
FIG. 5 is a flowchart illustrating an example of charge-discharge control operation performed by the charge-discharge control device according to Embodiment 1.

FIG. 5 is a flowchart illustrating an example of charge-discharge control operation performed by the charge-discharge control device according to Embodiment 1. The charge-discharge control device 1 acquires a warming-up operation command (step S10). If the temperature of the power storage device 13 is not equal to or less than a threshold having hysteresis characteristics, in other words if the temperature of the power storage device 13 is not equal to or less than a first threshold (N in step S20), the charge-discharge control device 1 does not perform the warming-up operation. If the temperature of the power storage device 13 is equal to or less than the first threshold (Y in step S20) and the SOC of the power storage device 13 is less than the upper limit (N in step S30), charging of the power storage device 13 starts (step S40). After the start of charging of the power storage device 13, the power storage device 13 is charged until the SOC of the power storage device 13 reaches the upper limit (Y in step S30).

If the SOC of the power storage device 13 reaches the upper limit (Y in step S30), discharging of the power storage device 13 starts (step S50). After the start of discharging of the power storage device 13, if the SOC of the power storage device 13 is greater than the lower limit (N in step S60) and the determiner 17 determines that the amount of power discharged via the first discharger 14 satisfies a criterion (Y in step S70), the power storage device 13 is discharged via the first discharger 14 (step S80). If the determiner 17 determines that the amount of power discharged via the first discharger 14 does not satisfy the criterion (N in step S70), the power storage device 13 is discharged via the second discharger 15 (step S90).

Thereafter, if the SOC of the power storage device 13 reaches the lower limit (Y in step S60), the processing returns to the step S20. If the temperature of the power storage device 13 is equal to or less than a threshold having hysteresis characteristics, in other words, if the temperature of the power storage device 13 is equal to or less than a second threshold (Y in step S20, then due to the SOC of the power storage device 13 being less than the upper limit (N in step S30), charging of the power storage device 13 starts again (step S40).

The power storage device 13 is repeatedly charged/discharged as described above, and if the temperature of the power storage device 13 reaches the second threshold (N in step S20), the charge-discharge control device 1 ends the warming-up operation. In the example of FIG. 5, the determination of whether the temperature of the power storage device 13 reaches the second threshold is performed at the end of discharging. However, this determination can be performed at any timing. Detection of the temperature of the power storage device 13 may be performed at given time intervals, and the charge-discharge control device 1 may end the warming-up operation when the detected temperature reaches the second threshold.

The performance of repeated charging-discharging in the warming-up operation may be intermittent. When the temperature of the power storage device 13 exceeds the second threshold at, for example, a time between the time T2 and the time T3 in FIG. 4 during the first warming-up operation, the charge-discharge control device 1 may end the warming-up operation at that time. The charge-discharge control device 1 may perform warming-up operation that discharges beforehand the power storage device 13 for the next warming-up operation. Moreover, for example, the charge-discharge control device 1 may start the warming-up operation while the load device is stopped, and in order to operate the load device, may suspend the warming-up operation. Then, after the load device is stopped, the charge-discharge control device 1 may resume the warming-up operation. When the warming-up operation is resumed, warming-up operation is performed that charges beforehand the power storage device 13 if the power storage device 13 is being charged at the time of suspension; and if the power storage device 13 is discharging at the time of suspension, warming-up operation is performed that resumes discharge of the power storage device 13. In such a case, a storage device stores the state, "charged" or "discharged", of the power storage device 13 at the time of suspension.

In order to keep the power storage device 13 warm, the controller 16 may be set to a state in which the warming-up operation command is always entered, regardless of the operation of the warming-up operation switch provided at, for example, the driving cab. When the warming-up operation command is always entered, the controller 16 automatically starts the warming-up operation when the temperature of the power storage device 13 becomes equal to or less than the first threshold.

As described above, the charge-discharge control device 1 according to Embodiment 1 enables more reliably raising the temperature of the power storage device 13 by performing the warming-up operation using the second discharger 15 when the amount of power discharged via the first discharger 14 does not satisfy a criterion. For example, discharging of the power storage device 13 via the second discharger 15 and raising the temperature of the power storage device 13 are enabled even if the first discharger 14 fails. The improvement of the reliability of the warming-up operation enables maintenance of the temperature of the power storage device 13 in a prescribed range over a prolonged time, for example, overnight.

Embodiment 2

Figure 6:
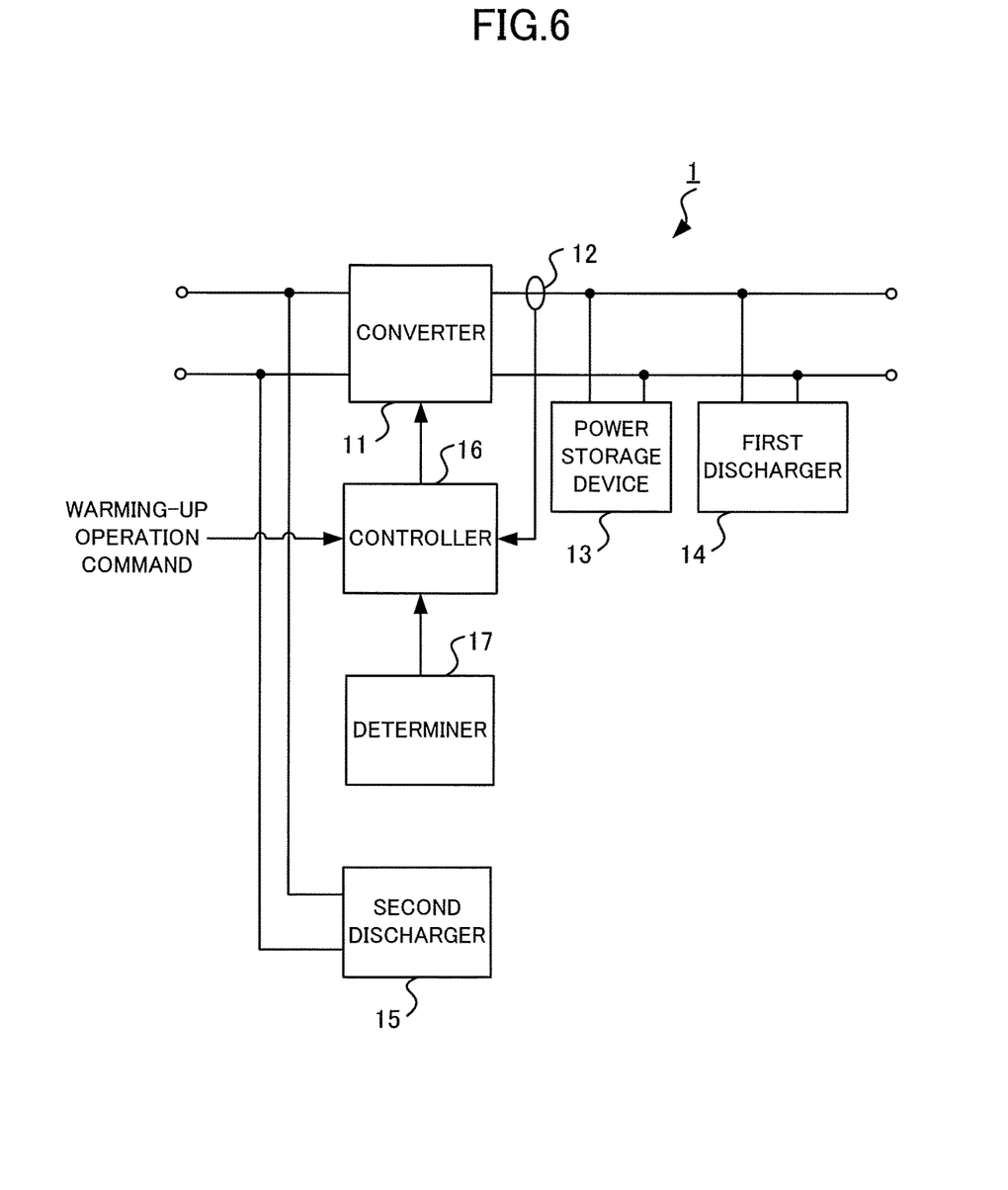
FIG. 6 is a block diagram illustrating an example configuration of a charge-discharge control device according to Embodiment 2 of the present disclosure.

FIG. 6 is a block diagram illustrating an example configuration of the charge-discharge control device according to Embodiment 2 of the present disclosure. The charge-discharge control device 1 according to Embodiment 2 includes the second discharger 15 on the input side of the converter 11. In Embodiment 2, the converter 11 is a power converter capable of two-way power conversion. For discharging the power storage device 13 via the first discharger 14 during the warming-up operation, the controller 16 stops the operation of the switching element of the converter 11 as in Embodiment 1. When the determiner 17 determines during the warming-up operation that the amount of power discharged via the first discharger 14 does not satisfy a criterion, the controller 16 reverses the direction of the output current of the converter 11 relative to the output current of the converter 11 during charging of the power storage device 13, and discharges the power storage device 13 via the second discharger 15.

Figure 7:
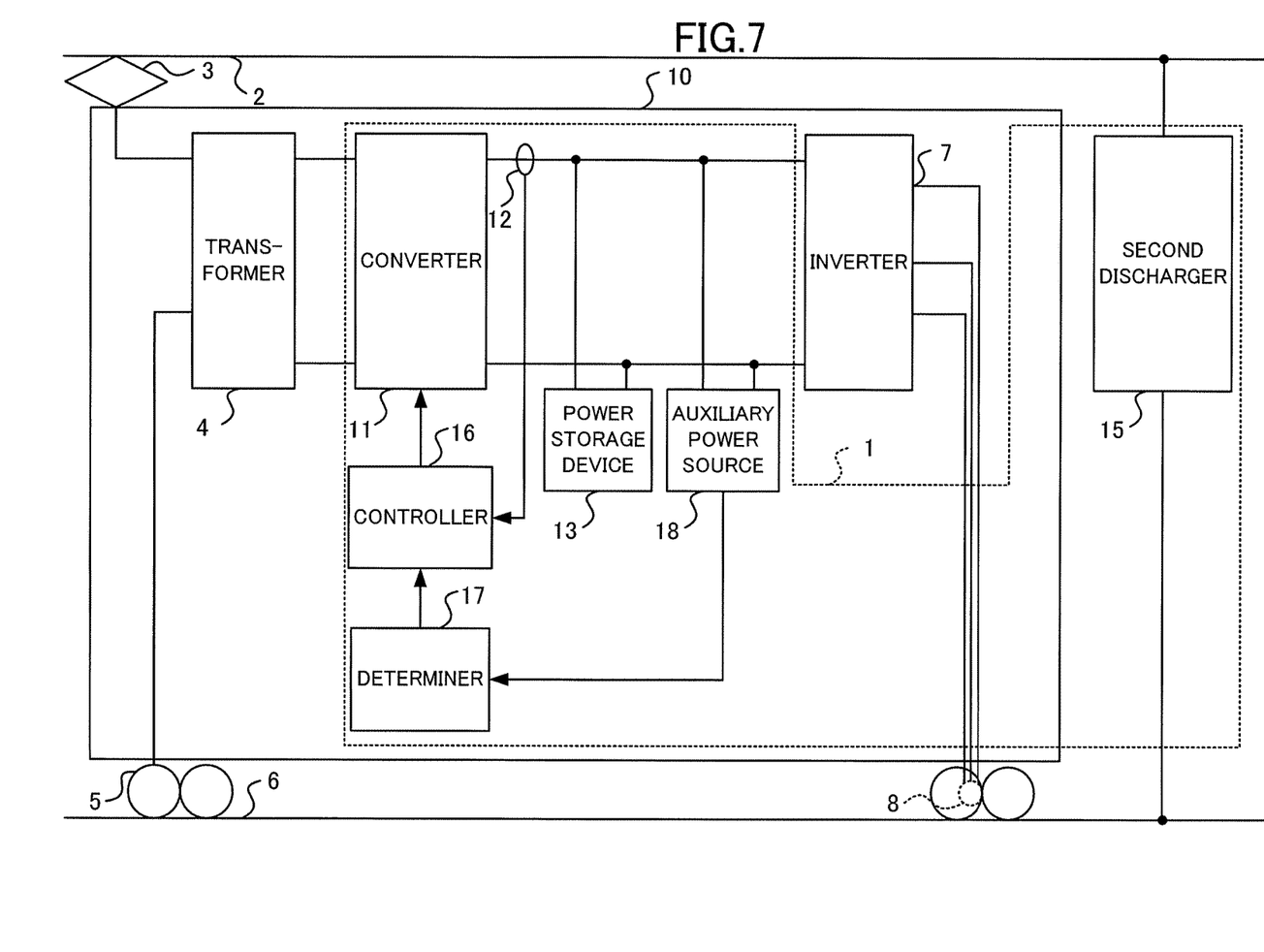
FIG. 7 is a block diagram illustrating an example of mounting the charge-discharge control device according to Embodiment 2 on an electric railway vehicle.

FIG. 7 is a block diagram illustrating an example of mounting the charge-discharge control device according to Embodiment 2 on an electric railway vehicle. The charge-discharge control device 1 includes the auxiliary power source 18 as the first discharger 14. The parts of the charge-discharge control device 1 other than the second discharger 15, are mounted on the electric vehicle 10, and the second discharger 15 is arranged outside of the electric vehicle 10. The second discharger 15 is electrically connected to the power storage device 13 via the overhead power line 2 that is a power supply path supplying power to the electric vehicle 10. The second discharger is, for example, an auxiliary power source, another electric vehicle, a power substation capable of giving/receiving power, a power storage system provided on the ground, and the like.

Figure 8:
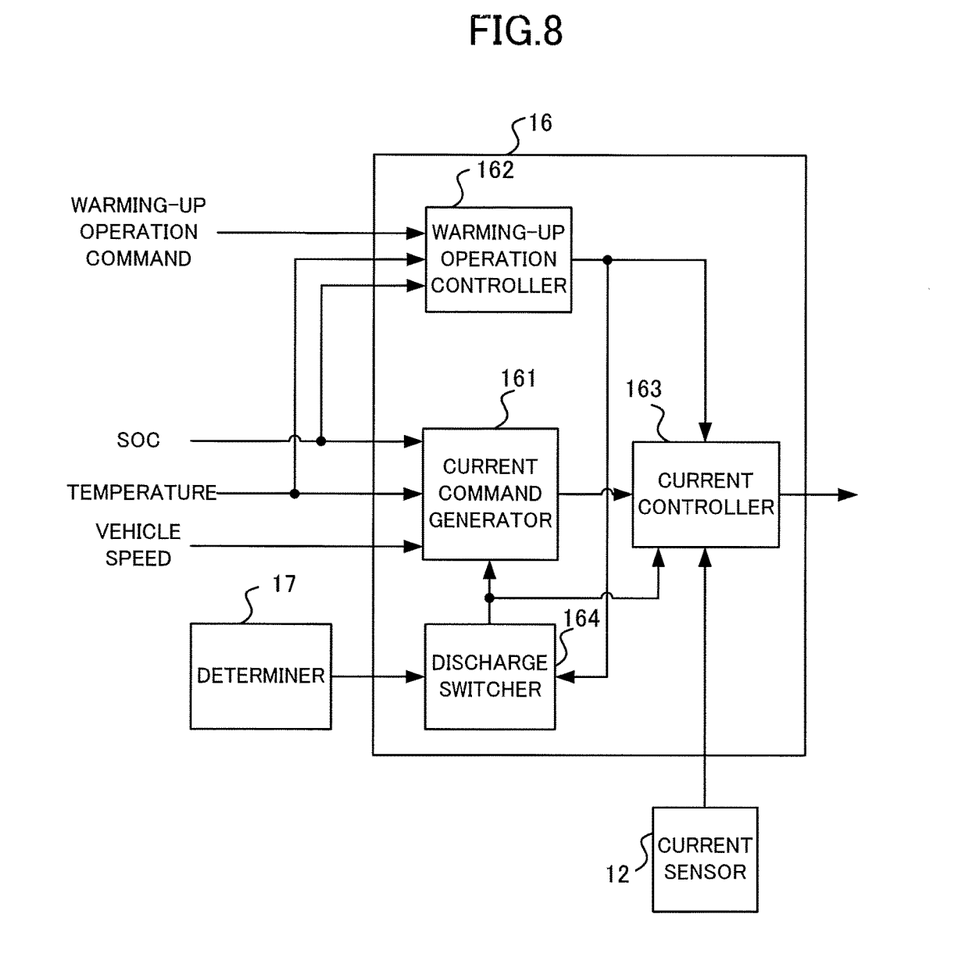
FIG. 8 is a block diagram illustrating an example configuration of a controller according to Embodiment 2.

FIG. 8 is a block diagram illustrating an example configuration of the controller according to Embodiment 2. Operation of the warming-up operation controller 162 is similar to that of Embodiment 1. The discharge switcher 164 outputs a current control signal, for controlling the direction of the output current of the converter 11, to the current command generator 161 and the current controller 163 on the basis of the switch signal output by the determiner 17 and the control signal output by the warming-up operation controller 162. The current control signal is of a level H when the switch signal is of the level H and the control signal is of the level L, and when the switch signal is of the level L, the current control signal is of a level L when the switch signal is of the level H and the control signal is of the level H.

When the warming-up operation is not in progress, and also during the warming-up operation when the amount of power discharged via the auxiliary power source 18 satisfies a criterion, the current command generator 161 generates a current command value on the basis of the SOC and temperature of the power storage device 13 and the vehicle speed and sends the current command value to the current controller 163 as in Embodiment 1. When the determiner 17 determines during the warming-up operation that the amount of power discharged via the auxiliary power source 18 does not satisfy a criterion during the charging of the power storage device 13, the current command generator 161 generates a current command value on the basis of the SOC and temperature of the power storage device 13, and the vehicle speed, as in Embodiment 1. When the determiner 17 determines during the warming-up operation that the amount of power discharged via the auxiliary power source 18 does not satisfy a criterion during discharging of the power storage device 13, the generated current command value is of the opposite direction to the direction of the current command value during charging of the power storage device 13. In other words, the current command generator 161 generates a current command value in a manner similar to that of Embodiment 1 when the current control signal is of the level L and generates a current command value of the opposite direction to the direction of the current command value during charging of the power storage device 13 when the current control signal is of the level H.

When the warming-up operation is not in progress, and also during the warming-up operation when the amount of power discharged via the auxiliary power source 18 satisfies a criterion, the current controller 163 outputs a gate signal in the same manner as in Embodiment 1. When the determiner 17 determines during the warming-up operation that the amount of power discharged via the auxiliary power source 18 does not satisfy a criterion, the current controller 163 performs feedback control so that the output current of the converter 1 approaches the current command value output by the current command generator 161 both during charging and discharging of the power storage device 13. In other words, the current controller 163 performs feedback control so that the output current of the converter 11 approaches the current command value output by the current command generator 161 when the control signal is of the level H and when the control signal is of the level L and the current control signal is of the level H. The current controller 163 stops the operation of the switching element of the converter 11 when the control signal is of the level L and the current control signal is of the level L.

Reversing the direction of the output current of the converter 11 during discharging of the power storage device 13 relative to the direction of the output current of the converter 11 during charging of the power storage device 13 enables discharging of the power storage device 13 via the second discharger 15 arranged at the input side of the converter 11.

As described above, the charge-discharge control device 1 according to Embodiment 2, by performing the warming-up operation via the second discharger 15 when the amount of power discharged via the first discharger 14 does not satisfy a criterion, enables more reliable raising of the temperature of the power storage device 13.

Embodiments of the present disclosure are not restricted to the above-described embodiments. The first discharger 14 and the second discharger 15 may be any discharge means that enable discharge of the power storage device 13. The first discharger 14 and the second discharger 15 may be arranged at either the input side or the output side of the converter 11. The first discharger 14 can be provided outside the electric vehicle 10, and the parts of the charge-discharge control device 1 other than the first discharger 14 can be mounted on the electric vehicle 10. In the case of using the discharge device 19 as the first discharger 14, the determiner 17 determines that the amount of power discharged via the discharge device 19 does not satisfy the criterion when the switch 191 is turned on and the current flowing through the discharge resistance 192 is not within a prescribed range. In the case of using as the first discharger 14 another electric vehicle, a power substation capable of giving/receiving power, a power storage system provided on the ground, and the like, the determiner 17 determines that the amount of power discharged via the first discharger 14 does not satisfy a criterion when the voltage of the overhead power line is not within a prescribed range.

The function of the controller 16 and/or determiner 17 may be incorporated as a part of the functions of a vehicle information control device. The controller 16 may have the functions of the determiner 17. The above-described configuration of the controller 16 is one example configuration. The controller 16 is any circuit that enables controlling charge-discharge of the power storage device 13 when the controller 16 acquires a warming-up operation command, and discharging the power storage device 13 via the second discharger 15 when the amount of power discharged via the first discharger 14 does not satisfy a criterion during the warming-up operation.

The method of mounting the charge-discharge control device 1 on the electric vehicle 10 is not restricted to the examples in FIG. 2 and FIG. 7. In FIG. 2 and FIG. 7, the auxiliary power source 18 may be connected to the input side of the converter 11, in other words to the third winding of the transformer 4. In the case of the electric vehicle 10 running in a direct-current electrified section, the transformer 4 does not need to be provided, and the auxiliary power source 18 is connected to the current collector 3 in parallel with the converter 11. When the auxiliary power source 18 is provided on the input side of the converter 11 in FIG. 2, the controller 16 reverses the direction of the output current of the converter 11 during discharging of the power storage device 13 in the warming-up operation relative to the direction of the output current of the converter 11 during charging of the power storage device 13. Moreover, when the amount of power discharged via the auxiliary power source 18 does not satisfy a criterion during the warming-up operation, the controller 16 repeats alternatingly charging and discharging the power storage device 13 by operating the switch 191 as described above. When the auxiliary power source 18 is provided on the input side of the converter 11 in FIG. 7, the controller 16 reverses the direction of the output current of the converter 11 during discharging of the power storage device 13 in the warming-up operation relative to the direction of the output current of the converter 11 during charging of the power storage device 13.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Charge-discharge control device
2 Overhead power line
3 Current collector
4 Transformer
5 Wheel
6 Rail
7 Inverter
8 Motor
10 Electric vehicle
11 Converter
12 Current sensor
13 Power storage device
14 First discharger
15 Second discharger
16 Controller
17 Determiner
18 Auxiliary power source
19 Discharge device
161 Current command generator
162 Warming-up operation controller
163 Current controller
164 Discharge switcher
191 Switch
192 Discharge resistance

The invention claimed is:

1. A charge-discharge control device, comprising:
a power storage device connected to an output side of a power converter;
a first discharger, electrically connected to the power storage device, to discharge the power storage device;
a second discharger, electrically connected to the power storage device, to discharge the power storage device;
a controller to charge and discharge the power storage device by controlling an output current of the power converter, and
a determiner to determine whether an amount of power discharged via the first discharger satisfies a criterion, wherein
when the controller acquires no warming-up operation command, the controller charges the power storage device;
when the controller acquires the warming-up operation command, the controller performs a warming-up operation by repeated alternatingly charging the power storage device and discharging the power storage device via the first discharger; and
when the controller acquires the warming-up operation command and the determiner determines that the amount of power discharged via the first discharger does not satisfy the criterion during the warming-up operation, the controller performs the warming-up operation by repeated alternatingly charging the power storage device and discharging the power storage device via the second discharger.

2. The charge-discharge control device according to claim 1, wherein
the first discharger is an auxiliary power source to convert and supply input power to a load device and output a stop signal when an amount of power supplied to the load device is outside a prescribed range, and
the determiner determines that the amount of power discharged via the first discharger does not satisfy the criterion when output of the stop signal by the auxiliary power source is detected by the determiner.

3. The charge-discharge control device according to claim 1, wherein
the second discharger is a discharge device connected to the output side of the power converter and comprises a switch and a discharge resistance that are connected in series, and
when the controller acquires the warming-up operation command and the determiner determines that the amount of power discharged via the first discharger does not satisfy the criterion during the warming-up operation, the controller operates the switch to perform the warming-up operation by repeated alternatingly charging the power storage device and discharging the power storage device via the second discharger.

4. The charge-discharge control device according to claim 1, wherein
the power converter, the power storage device, the first discharger, the controller, and the determiner are mounted on a vehicle supplied with power from a power source via a power supply line, and
the second discharger is arranged outside the vehicle and is electrically connected to the power storage device via the power supply line.

5. The charge-discharge control device according to claim 1, wherein when the controller acquires the warming-up operation command, the controller:
charges the power storage device until a charge state of the power storage device reaches an upper limit of a prescribed range;
starts discharging the power storage device when the charge state of the power storage device reaches the upper limit; and
starts charging the power storage device when the charge state of the power storage device reaches a lower limit of the prescribed range during the warming-up operation.

6. The charge-discharge control device according to claim 1, wherein when the controller acquires the warming-up operation command, the controller:
charges the power storage device until a voltage of the power storage device reaches an upper limit of a prescribed range;
starts discharging the power storage device when the voltage of the power storage device reaches the upper limit; and
starts charging the power storage device when the voltage of the power storage device reaches a lower limit of the prescribed range during the warming-up operation.

7. The charge-discharge control device according to claim 1, wherein
the controller starts the warming-up operation when the controller acquires the warming-up operation command and a temperature of the power storage device is equal to or less than a first threshold, and ends the warming-up operation when the temperature of the power storage device reaches a second threshold greater than the first threshold after starting the warming-up operation.

* * * * *